March 19, 1957 M. W. FORTH 2,785,811
POWER MECHANISM CONTROL, ESPECIALLY FOR BALE LOADING APPARATUS
Filed Jan. 13, 1956 2 Sheets-Sheet 1
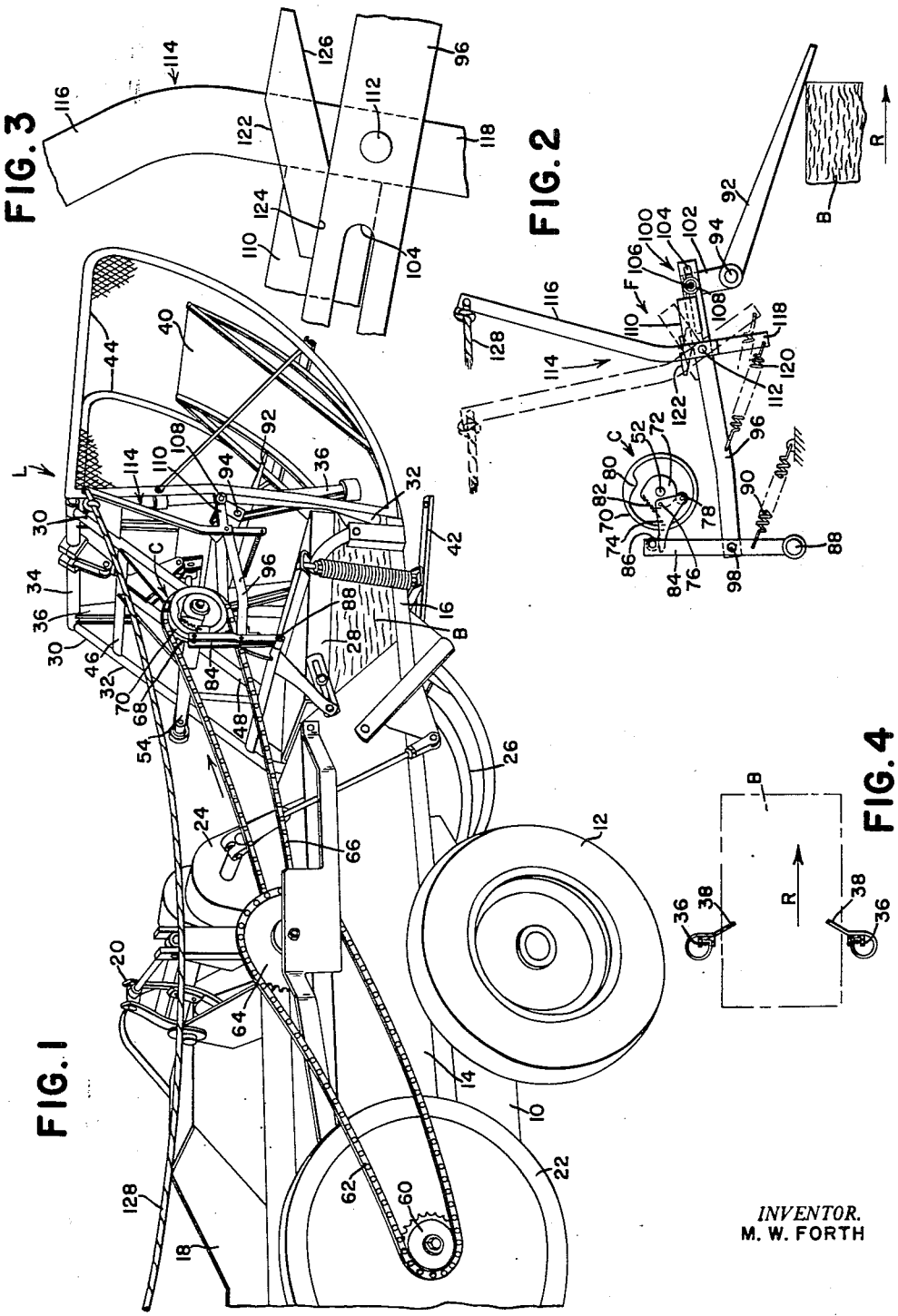
INVENTOR.
M. W. FORTH March 19, 1957  M. W. FORTH  2,785,811
POWER MECHANISM CONTROL, ESPECIALLY FOR BALE LOADING APPARATUS
Filed Jan. 13, 1956  2 Sheets-Sheet 2
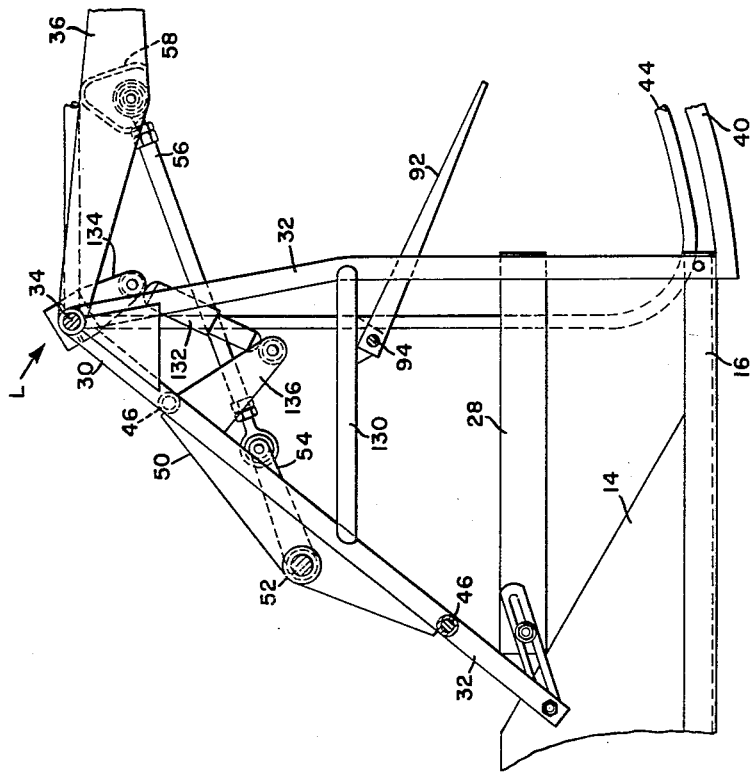
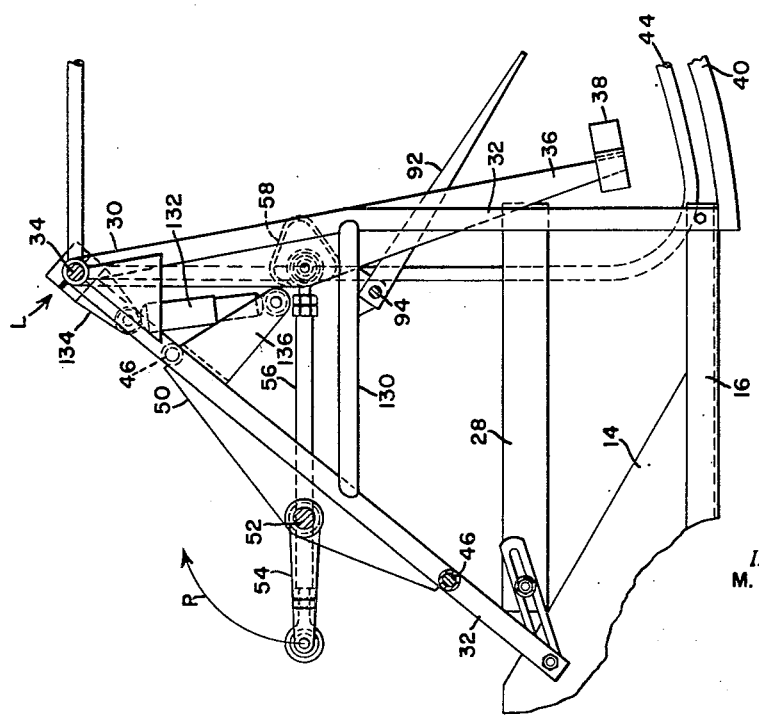
INVENTOR.
M. W. FORTH

United States Patent Office 2,785,811
Patented Mar. 19, 1957

2,785,811

POWER MECHANISM CONTROL, ESPECIALLY FOR BALE LOADING APPARATUS

Murray W. Forth, Moline, Ill., assignor to Deere & Company, Moline, Ill., a corporation of Illinois Application January 13, 1956, Serial No. 558,866

14 Claims. (Cl. 214—83.3)

This invention relates to power mechanism control and especially to such control as finds particular utility in bale loading apparatus of the type forming the subject matter of assignee's copending application Ser. No. 501,-126, filed April 13, 1955, now Patent No. 2,756,865.

In the patent referred to, a conventional baler is modified by the inclusion therein of structure adapted to handle bales produced by the conventional baling mechanism of the baler. The baler operates in a typical manner to produce successive individual bales which are discharged at the discharge end of the bale case. As each bale emerges from the bale case, the loading structure grips that bale and moves it to a point relatively remote from the bale case, specifically throwing the bale into a wagon trailed by the baler. The handling or throwing mechanism is intermittently operated by power mechanism responsive to a bale-sensing device that functions at intervals according to the successive emergence of bales.

The principal object of the present invention is to provide improved control means for the power-operated mechanism. It is also an object of this invention to provide an improved control for power operated mechanism in general. The most significant feature of the invention is the arrangement of control means in which the power operated mechanism is automatically controlled by a sensing device, but provision is made for disconnecting the automatic control and further provision is made for superseding the automatic control by manual control. In the case of the baler and bale loading structure, this is important from the standpoint of affording the operator a means for throwing out the automatic control and thereby to prevent throwing of bales in certain circumstances, such as when the baler and trailer, upon turning a corner, are so angularly related that a thrown bale would miss the trailer. The flexibility of the control also affords the operator an opportunity to trip the power-operated mechanism prior to the time that it would be tripped automatically, thus enabling him to load a bale before a situation arises in which automatic operation would not be suitable.

The invention features a construction that may be readily incorporated in the subject matter of the above-identified application without material alteration of the basic structure.

The foregoing and other important objects and desirable features inherent in and encompassed by the invention will become apparent as a preferred embodiment thereof is disclosed by way of example in the ensuing specification and accompanying drawings, the several figures of which are described immediately below.

Fig. 1 is a fragmentary perspective of a baler equipped with bale throwing mechanism and incorporating the inventive power control means.

Fig. 2 is a fragmentary view, partly schematic, illustrating the operation of the control means.

Fig. 3 is an enlarged fragmentary view illustrating a portion of the control means.

Fig. 4 is a schematic plan view illustrating the manner in which the throwing mechanism grips an emerging bale.

Figs. 5 and 6 are fragmentary side elevational views illustrating the throwing mechanism in different positions.

Those familiar with agricultural balers will recognize in Fig. 1 basic baler structure of the so-called in-line type, such as shown in the U. S. patent to Crumb 2,450,082. The presently illustrated baler, like the conventional baler, comprises a main frame 10 carried on ground wheels, one of which is shown at 12, for advance over a field when drawn by a tractor or other suitable vehicle (not shown). The main frame supports a fore-and-aft extending bale case 14 which has a rearward bale case extension 16. As the baler is drawn over the field, crops lying on the field are picked up by pick-up mechanism (not shown) and are delivered rearwardly to a feeder housing 18 from which the crops are moved laterally into the bale case 14 by feed mechanism, a portion of the drive for which is visible at 20. When the crops enter the bale case 14, they are compacted by successive compression strokes of a reciprocating plunger (not shown) driven from a transverse crankshaft, the end of which carries a flywheel 22. When each bale attains a predetermined length, determined by measuring mechanism not material here, it is tied by wire or twine, for example, and ultimately emerges at the rear end of the baler through the bale case extension 16. The numeral 24 represents a housing containing any suitable form of tying mechanism, and the numeral 26 indicates a pair of tying needles that move intermittently up through the bale case and behind the bale just formed. The bale formed and tied serves as a header for a succeeding bale and as successive bales are formed and tied, the first formed bale is discharged rearwardly through the bale case extension 16. This extension includes a top plate 28 for affording the necessary resistance to passage of the bales therethrough and therefore serves as a control on the density of the bale, which details are not material but are mentioned here only because typical components are illustrated.

In conventional pick-up baling operation, the baler is drawn over the field by a tractor and successive bales are discharged through the bale case extension 16 to drop onto the ground, being subsequently picked up by manual or mechanical means. In some cases, the bale case extension will be supplemented by a chute up which the bales move to be manually removed by an operator riding on a trailer towed by the baler. In the present disclosure, manual labor is eliminated, at least in the handling of the bales, because the baler is equipped with bale loading structure designated here in its entirety by the letter L. The particular structure comprises supporting means made up of a pair of transversely spaced apart A frames 30, each of which has depending legs 32 rigidly secured to the bale case 14 and to the floor of the bale case extension 16. The frames are joined at their apices by a transverse pivot shaft 34 which affords a mount for a pair of depending bale-gripping arms 36. Each arm carries at its lower or free end a bale gripper 38 (Fig. 4) and as a bale B emerges, it does so between the grippers 38. These grippers are so shaped as to permit travel of the bale rearwardly (arrow R, Fig. 4) but, when the throwing arms 36 are actuated, the grippers 38 bite into the sides of the bale.

The throwing arms 36 are shown in what may be termed a starting position in Figs. 1 and 5, in which position they are normally at rest until the bale B emerges to a predetermined rearward extent, after which power-operated mechanism, to be presently described, is effectuated to cause the arms 36 to swing upwardly and rearwardly (Fig. 6) in such manner that the gripped bale is thrown rapidly upwardly and rearwardly, which phase of the operation is facilitated to some extent by an upwardly and rearwardly curved chute 40. The throwing action is characterized by rapid acceleration and then deceleration of the throwing arms 36 as they move from the starting position of Figs. 1 and 5 to the throwing position of Fig. 6. Because of the deceleration and the shape of the grippers 38, the bale B is automatically released and its own momentum carries it in a trajectory such that it will be deposited in a trailer towed by the baler, the latter having a trailer hitch 42 for that purpose. The loader structure has safety frames 44, one at each side, preferably of the wire mesh type.

The foregoing will suffice for a general description of the baler and the bale throwing mechanism. In brief, its operation involves the successive formation of bales, which emerge through the bale case extension 16, to be received by the grippers 38 on the throwing arms 36. After the bale emerges to a predetermined extent, the throwing mechanism is actuated to throw the bale upwardly and rearwardly to a trailing vehicle or other receptacle. The following description will pertain to the power-operated mechanism and the control thereof.

The loader frame structure 30, 30 is supplemented by miscellaneous crossbars 46 and an intermediate generally upright bar 48 and these serve to support plates 50 that afford bearings for journalling a transverse crankshaft 52 having a drive arm 54 pitman-connected at 56 to a cross support 58 that spans the bale-throwing arms 36. The crankshaft 52 is rotatable through 360° and in its cycle of movement travels from the position of Fig. 5, through the position of Fig. 6 and back to the position of Fig. 5, the direction of rotation being indicated by the arrow P (Fig. 5). Drive for powering the crankshaft 52 is derived in the first instance from a sprocket 60 rotatable with the baler flywheel 22. A drive chain 62 connects this sprocket to an intermediate sprocket 64 which, through gearing not shown, transmits the drive to a second chain 66 which is trained about a sprocket 68 integral with the constantly rotating part or driving member 70 of a one-revolution clutch C that comprises the power-operated drive mechanism for driving the throwing arms 36 via the crankshaft 52 and pitman 56.

The clutch C includes an intermittently rotating part or driven member 72, which is keyed to the outer or left hand end of the thrower crankshaft 52 (Fig. 2). The clutch may be of any well-known type, such as that disclosed in the U. S. patent to Tuft 2,546,324, and is chosen for purposes of illustration, since it lends itself very well to the purposes required in the operation of the loader. It will be understood, however, that any other selectively engageable and disengageable power-operated mechanism could be used. It is, therefore, typical of the drive mechanism that the crankshaft 52 is normally at rest with the intermittently rotating part 72, while the constantly rotating or driving part 70 rotates as long as drive is supplied thereto from the flywheel sprocket 60. A clutch or equivalent mechanism of this character is operated at intervals by engaging and disengaging the driving and driven parts as respects each other. In the clutch shown here, this selective connection and disconnection is effected by a clutch pawl 74 pivoted at 76 to the driven part 72 and having a roller 78 engageable with a drive lug or hump 80 formed on the inner periphery of the driving member 70. A tension spring 82 biases the pawl in such direction that the roller 78 is urged into the path of the lug or hump 80. Disconnection between the clutch parts is effected by an actuating member 84 having an idle position (Fig. 2) in which a roller 86 thereon intercepts the free end of the pawl 74 and causes the pawl to be held against the bias of its spring 82 in such position that the roller 78 is clear of the driving hump or lug 80 on the driving part 70. The actuating member 84 is rockably or pivotally mounted at 88, as by means of a rockshaft, on the downwardly and forwardly extending leg or support 32 of the left hand loader frame 30. A spring 90 serves as means to bias the actuating member 84 to the position of Fig. 2, from which position it may be moved at intervals to an operating position for releasing the pawl 74 so that the pawl spring 82 swings the pawl radially outwardly for placing the pawl roller 78 in the path of the driving lug 80. It is in the phase of controlling the actuating member 84, and therefore controlling the clutch C, that the instant invention is significant.

The clutch C is normally disengaged during the formation of bales by the mechanism in the bale case 14 and engagement of the clutch C is caused to occur when an emerging bale has moved rearwardly far enough to be gripped by the throwing arms 36. For this purpose, the clutch is normally responsive to the operation of a bale-sensing member 92, which member is carried on a transverse rockshaft 94 and has a rearward end portion depending partially into the path of emergence of the ejected bale B (Fig. 2). In the absence of an emerging bale, the sensing member 92 is normally biased downwardly to what may be termed an inactive position, from which position it is movable upwardly by an emerging bale to an active position. For the purpose of co-ordinating the active position of the sensing member 92 with the operating or clutch-engaging phase of the actuating member 84, the two members 84 and 92 are associated with force-transmitting means, designated in its entirety by the letter F, selectively connectible and disconnectible between the members. This means comprises a force-transmitting link 96 having a force-transmitting connection via a pivot 98 at its front end to an intermediate portion of the actuating member 84 and having a lost-motion connection 100 at its rear end to an upstanding arm 102 fixed to the sensing member rockshaft 94. The lost-motion connection here comprises a slot 104 in the link 96 and a pin 106 carried by the sensing member arm 102. The pin carries a roller 108 outside of the slot 104. Whether or not the clutch is controlled by active positioning of the sensing member 92 depends upon whether the force-transmitting means F is connected or disconnected between the members 84 and 92. When the force-transmitting means is connected, operation of the clutch C occurs automatically in response to active positioning of the sensing member 92 as a bale B emerges in the direction of the arrow R to a predetermined extent.

Connection and disconnection of the force-transmitting means between the members 84 and 92 is accomplished by the inclusion in the means F of a drive element in the form of an arm 110 having a pivotal mounting 112 on the link 96. In the preferred embodiment illustrated, the drive element 110 is incorporated as the first arm of a lever in the form of a bell crank 114, which constitutes control means for accomplishing the three functions of connecting the force-transmitting means, disconnecting the force-transmittting means and furnishing a device by means of which the clutch C may be manually tripped or engaged. The bell crank 114 has a second arm 116 (in addition to the arm 110) and a third and integral arm 118 projects below the pivot 112 to furnish means for the connection of a biasing spring 120, the other end of the spring being connected to the link so that the biasing means functions to urge the bell crank 114 always in a clockwise direction, which entails automatic connection of the force-transmitting means F, since when the bell crank 114 is so biased, the drive element 110 is in a position to engage the roller 108 on the pin 106 in the lost-motion connection 100. Since the roller 108 can engage the drive element 110, the lost-motion connection is negatived. It will be clear that when the bell crank 114 is rocked forwardly or in a counterclockwise direction (dotted lines in Fig. 2) the drive element 110 is lifted clear of the roller 108 so as to re-effectuate the lost-motion connection. The positions of the bell crank 114 are determined by a stop 122, the details of which are best shown in Fig. 3. This stop is preferably welded or otherwise rigidly secured to the bell crank 114 just above the pivot 112 and has a pair of angularly related stop portions 124 and 126 selectively engageable with the top edge of the link 96 respectively at opposite sides of the pivot 112. When the bell crank is rocked rearwardly or in a clockwise direction (Fig. 2; counterclockwise in Fig. 3) under action of the spring 120, the stop portion 124 engages the top edge of the link 96 rearwardly of the pivot 112. This may be considered to be the first or starting position of the bell crank or control means. A second and forwardly successive or sequential position of the bell crank 114 is determined by engagement of the stop portion 126 with the top edge of the link 96 ahead of the pivot 112 when the bell crank 114 is rocked forwardly or in a counterclockwise direction (clockwise as viewed in Fig. 3). The bell crank has a third position forwardly beyond the second position, which position entails shifting of the bell crank and the link 96 as a unit, whereby the bell crank serves as means for transmitting force to the actuating member 84 via the link 96 independently of the sensing member 92. Thus, an operator on the tractor that draws the baler is able to regulate not only the type of control involved but may also influence the control by his own manual effort, as by means of a trip or control rope 128 that extends from the arm 116 of the bell crank 114 forwardly to a position convenient to the operator on the tractor, whereby a remote control is afforded. When the operator releases tension on the rope 128, the spring 120 returns the bell crank in a clockwise direction and the spring 90 returns the actuating member to its Fig. 2 position. At that time, the bale gripped between the throwing arms 36 will have been trajected rearwardly and therefore the sensing member 92 may drop downwardly so that the pin 106 at the upper end of the sensing member arm 102 will travel to the rearward end of the link slot 104, wherefore the short arm or driving element 110 on the bell crank will drop into place ahead of the roller 108 to set up the structure for subsequent operation.

The rockshaft 94 of the sensing member 92 is appropriately supported by fore-and-aft frame members 130 of the loader frames 30. As previously described, the pivot shaft 88 for the actuating member 84 is supported by the left hand frame 30. The connections at 98 and 100 of the front and rear ends respectively of the link 96 to the members 84 and 102 support the link so that it needs no support other than that described. The connections 98 and 100 include pivots, of course, to accommodate the angular swinging of the members 84 and 102 as they swing about their respective pivots 88 and 94.

In order that the action of the throwing arms 36 may be controlled, the loader structure includes retarding means, here in the form of a hydraulic shock absorber 132, one end of which is connected to an arm 134 keyed to the pivot shaft 34 and the other end of which is connected to an appropriate support 136. It will be noted that in the starting position of the throwing arms 36 (Fig. 5), the linkage established by the arm 134 and shock absorber 132 is forwardly of a straight line drawn between the shaft 34 and the free end of the support 136, and that just the opposite is true of the situation when the throwing arms 36 are in their throwing position (Fig. 6). Hence, as the arms 36 start to move rearwardly and upwardly, the shock absorber is first compressed as the linkage passes over center, and is then extended as the arms 36 proceed to their throwing position. When the arms return to their starting position, the shock absorber is again first compressed and then extended, as the linkage passes over center to return to the starting position of Fig. 5. The details of the arrangement are not important here, since they form the subject matter of assignee's copending application Serial No. 561,455, filed January 26, 1956, but are referred to because they are illustrated along with the basic structure.

*Operation*

As previously described, the baling mechanism in the baler successively forms and ties bales as the machine is drawn over the field. As a finished and tied bale emerges through the bale case extension 16, as in the case of the bale B, the normally idle or inactive clutch C is engaged to drive the thrower crankshaft 52 through one revolution so as to cause the bale B to be trajected rearwardly by the throwing arms 36. Pending the emergence of the bale B, the sensing member 92 is in its downward position, and consequently the pin 106 in the sensing member arm 102 is at the rear end of the slot 104 in the link 96. The spring 90 is holding the actuating member 84 in its Fig. 2 position so that the actuating member roller 86 intercepts the pawl 74, whereby the pawl is in its disengaged position. Therefore, the constantly rotating part 70 may receive power from the driving mechanism without transmitting that power to the crankshaft 52. As the bale B emerges under the influence of another bale being compacted within the bale case 14, the inactive sensing member 92 gradually moves to its active position and the roller 108 on the sensing member arm 102 approaches the rear end of the driving element 110. Since the arm 110 is part of the bell crank 114 and since the bell crank is connected at 112 to the link 96, the sensing member, as it moves to its active position, acts through the now connected force-transmitting means F to transmit force to the actuating member 84, moving that member forwardly against the spring 90 so that the pawl 74 of the clutch is released to establish a driving connection between the driving and driven parts. It is to be noted that the transmission of force from the roller 108 to the drive element 110 is along a straight line below the engagement of the stop portion 124 of the stop 122 with the top edge of the link 96 rearwardly of the pivot 112. Therefore, the bell crank 114 cannot be rocked in a clockwise direction merely by action of the roller 108 in engagement with the drive element 110, nor can the bell crank 114 be inadvertently rocked in a counterclockwise direction.

As soon as the clutch parts 70 and 72 are interconnected by the pawl 74, rotation is imparted to the crankshaft 52, causing the crankshaft to rotate in the direction of the arrow P and, through the pitman 56, driving the throwing arms 36 upwardly and rearwardly to traject the bale B. As soon as the bale B is moved out from under the sensing member 92, that member drops by gravity to its inactive position, followed by return of the link 96 and actuating member 84 to their respective first or starting positions, the biasing springs 90 and 120 serving to accomplish this return, whereupon the drive element 110 on the bell crank 114 drops into place ahead of the roller 108 and sets up the arrangement for subsequent operation. In the normal course of events, automatic operation of the clutch C will occur, one revolution at a time, each time a bale emerges to its predetermined position to be engaged by the throwing arms 36, it being understood that when the actuating member 84 returns to its Fig. 2 position, it intercepts the pawl 74 and causes disengagement between the roller 78 and lug 80 so that the crankshaft is again idled at each end of its 360 degrees of revolution.

At the end of a field or even during extreme conditions in baling on contours, the corners negotiated by the vehicular train made up of the tractor, baler and trailer, may be so sharp as to cause a substantial angular displacement between the baler and the trailer, thereby effecting misalinement between the loader L and the wagon or trailer, whereby bales trajected by automatic operation would completely miss the wagon. For this purpose, the control means or bell crank 114 has the attributes previously described. That is to say, the operator may, by tensioning the control rope 128 move the bell crank 114 forwardly to its dotted line position as shown in Fig. 2, thereby clearing the drive element 112 from the roller 108 and thereby effectuating the lost-motion connection 100, from which it follows that the sensing member 92 may move to its active position without having any effect on the link 96. Thus, the operator is able to negative or cancel, temporarily, the automatic operation of the control means until the baler and trailer become sufficiently alined to operate normally as far as concerns the deposit of bales into the trailer. As already noted, the stop portion 126 on the stop member 122 will, when the bell crank 114 is rocked forwardly, engage the top edge of the link 96 ahead of the pivot 112, which in effect rigidifies the bell crank and link so that a further or sequential pull on the rope 128 will result in the application of a forward manual force to the actuating member 84, whereby the operator himself positively trips or engages the clutch C so as to incur operation of the loader for discharging therefrom the bale that was not previously discharged because of temporary interruption of the automatic operation of the mechanism. The manual control has the added feature of enabling the operator to incur operation of the loader, even though the emerging bale has not emerged to its predetermined extent, which operation may be desirable when the operator anticipates a situation in which automatic operation would, if delayed until its proper time, occur disadvantageously.

Summary

It will be clear from the foregoing description that the control mechanism is extremely simple, flexible and readily adaptable to a loader of the particular type referred to. Further than that, it will also be seen that the control is adaptable for circumstances other than those illustrated. The sequential positioning or operation of the control means or bell crank 114 is significant in giving the operator the necessary dominance over the automatic control, enabling him to interrupt the automatic control and also to override the automatic control. When the bell crank 114 is rocked forwardly to engage the stop 126 with the top edge of the link 96 ahead of the pivot 112, added resistance to further forward rocking is set up by a combination of forces including the spring 120, whereby the operator is afforded a sufficient amount of "feel" to appreciate that the disconnect position has been attained and that a further pull on the rope 128 will achieve manual tripping of the clutch C. Features of the invention not categorically enumerated will undoubtedly occur to those versed in the art, as will many modifications and alterations in the preferred embodiment illustrated, all of which may be achieved without departure from the spirit and scope of the invention.

What is claimed is:

1. For a baler having bale-forming means including a bale-discharge portion from which individual completed bales emerge in succession as the baler operates: bale-throwing apparatus for throwing each emerging bale distantly from the bale-discharge portion of the baler, comprising: supporting structure having means thereon for affixation thereof to the baler; a bale-throwing element having a starting position proximate to the bale-discharge portion of the baler; means connecting said element to the supporting structure for movement thereof on a throwing stroke away from and on a successive return stroke back to said starting position; bale-engaging means on said element for receiving and engaging an emerging bale, said means being releasable on the throwing stroke to enable departure of the bale beyond said element; selectively engageable and disengageable power-operated mechanism on the supporting structure and including a driving connection to the bale-throwing element for moving said element on its throwing and return strokes; an actuating member movable between idle and operating positions for respectively incurring disengagement and engagement of the power-operated mechanism; a normally inactive bale-sensing member movable to an active position in response to emergence of a bale; force-transmitting means selectively connectible and disconnectible between the actuating member and the bale-sensing member for enabling movement of said members respectively in unison or separately; and shiftable control means movable from a first position incurring connection of the force-transmitting means between said members to a second position effective to disconnect said force-transmitting means, said control means being additionally movable to a third position beyond said second position for moving the actuating member to its operating position independently of the sensing member.

2. The invention defined in claim 1, in which: the force-transmitting means comprises a link having a force-transmitting connection at one end to the actuating member and having a lost-motion connection at its other end to the bale-sensing member and a drive element shiftable on the link between drive and release positions for respectively negativing and establishing the lost-motion connection; the control means is connected to the drive element for incurring the drive and release positions of said drive element respectively in said first and second positions of the control means; and said drive element has a stop thereon engaging the link in the idle position of said drive element whereby movement of the control means to its third position transmits force to the actuating member via the drive element, the drive element stop, the link and the force-transmitting connection of the link to said actuating member.

3. The invention defined in claim 2, in which: the actuating member and the bale-sensing member are independently pivotally mounted so that each has arcuate movement; the force-transmitting connection of the link to the actuating member includes a pivot for supporting said one end of the link; and the lost-motion connection includes a pin on the bale-sensing member and a slot in the link and riding said pin for supporting said other end of the link.

4. The invention defined in claim 3, in which: the control means and drive element are combined as a lever pivoted to the link and having two arms, one of which arms is the drive element and the other of which arms is the control means.

5. For a baler having bale-forming means including a bale-discharge portion from which individual completed bales emerge in succession as the baler operates: bale-throwing apparatus for throwing each emerging bale distantly from the bale-discharge portion of the baler, comprising: supporting structure having means thereon for affixation thereof to the baler; a bale-throwing element having a starting position proximate to the bale-discharge portion of the baler; means connecting said element to the supporting structure for movement thereof on a throwing stroke away from and on a successive return stroke back to said starting position; bale-engaging means on said element for receiving and engaging an emerging bale, said means being releasable on the throwing stroke to enable departure of the bale beyond said element; selectively engageable and disengageable power-operated mechanism on the supporting structure and including a driving connection to the bale-throwing element for moving said element on its throwing and return strokes; an actuating member movable between idle and operating positions for respectively incurring disengagement and engagement of the power-operated mechanism; a normally inactive bale-sensing member movable to an active position in response to emergence of a bale; force-transmitting means selectively connectible and disconnectible between the actuating member and the bale-sensing member for enabling movement of said members respectively in unison or separately; and shiftable control means movable from a first position incurring connection of the force-transmitting means between said members to a second position effective to disconnect said force-transmitting means independently of the sensing member.

6. The invention defined in claim 5, in which: the force-transmitting means comprises a link having a force-transmitting connection at one end to the actuating member and having a lost-motion connection at its other end to the bale-sensing member and a drive element shiftable on the link between drive and release positions for respectively negativing and establishing the lost-motion connection; and the control means is connected to the drive element for incurring the drive and release positions of said drive element respectively in said first and second positions of the control means.

7. The invention defined in claim 6, in which: the actuating member and the bale-sensing member are independently pivotally mounted so that each has arcuate movement; the force-transmitting connection of the link to the actuating member includes a pivot for supporting said one end of the link; and the lost-motion connection includes a pin on the bale-sensing member and a slot in the link and riding said pin for supporting said other end of the link.

8. Control apparatus, comprising: a sensing member movable at intervals from a first position to a second position at intervals; power-operated mechanism selectively changeable for operation in different phases and including an actuating member movable between first and second positions respectively incurring first and second operating phases of said mechanism; force-transmitting means selectively connectible and disconnectible between the members for enabling movement of said members in unison or separately; shiftable control means operative in a first position to incur connection of said means to cause movement of the actuating member automatically in response to movement of the sensing member and operative, selectively, in a second position effecting disconnection of said means to enable movement of the sensing member without moving the actuating member; and means in addition to the sensing member for moving the actuating member to its second position while the force-transmitting means is disconnected.

9. Control apparatus, comprising: a sensing member movable at intervals from a first position to a second position at intervals; power-operated mechanism selectively changeable for operation in different phases and including an actuating member movable between first and second positions respectively incurring first and second operating phases of said mechanism; force-transmitting means selectively connectible and disconnectible between the members for enabling movement of said members in unison or separately; and manually operated control means operative in a starting position to incur connection of said means to cause movement of the actuating member automatically in response to movement of the sensing member and shiftable unidirectionally and in sequence through a disconnect position effecting disconnection of said means from the sensing member to an operating position for transmitting manual force through the force-transmitting means to the actuating member to move said member to its second position.

10. Control apparatus, comprising: power-operated mechanism selectively changeable for operation in first and second operating phases and including an actuating member movable between first and second positions for respectively incurring said first and second operating phases; a sensing member movable at intervals from a first position to a second position; a force-transmitting link having a direct force-transmitting connection at one end to one member and having a lost-motion connection at its other end with the other member so that the sensing member is capable of movement to its second position without incurring movement of the actuating member; a drive element shiftable on the link between a drive position negativing the lost-motion connection and a release position effectuating the lost-motion connection; and control means for selectively shifting the drive element.

11. The invention defined in claim 10, in which: the force-transmitting connection and the lost-motion connection are effected respectively to the actuating and sensing members so that when the drive element is in its release position the sensing member moves relative to the link and the link remains stationary with the actuating member; and the control means has a stop thereon engageable with the link, after movement of the drive element to its release position, for effecting further movement of the control means and link in unison to move the actuating member to its second position independently of the sensing member.

12. Control apparatus, comprising: power-operated mechanism selectively changeable for operation in first and second operating phases and including an actuating member movable between first and second positions for respectively incurring said first and second operating phases; a sensing member movable at intervals from a first position to a second position; a force-transmitting link having a direct force-transmitting connection at one end to one member and having a lost-motion connection at its other end with the other member so that the sensing member is capable of movement to its second position without incurring movement of the actuating member; a bell crank pivoted to the link in spaced relation to the member to which the lost-motion is effected, said bell crank having a first arm positionable in engaged relation with said member to which the lost-motion connection is effected so as to negative said lost-motion connection, said lever having a second arm for receiving force to rock the lever and thus to swing the first arm out of said engaged relation so as to restore said lost-motion connection.

13. The invention defined in claim 12, including: means biasing the lever to a position in which the first arm occupies said engaged relation.

14. The invention defined in claim 13, including: a stop on the lever engageable with the link after movement of said first arm out of said engaged relation so that further force on the second arm moves the lever and link in unison.

No references cited.